United States Patent
Hsieh et al.

(10) Patent No.: US 8,275,923 B2
(45) Date of Patent: Sep. 25, 2012

(54) HIGH SPEED DATA STORAGE SYSTEM

(75) Inventors: Po-Chuan Hsieh, Taipei Hsien (TW);
Chien-Hung Liu, Taipei Hsien (TW);
Yu-Chang Pai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 247 days.

(21) Appl. No.: 12/880,155

(22) Filed: Sep. 13, 2010

(65) Prior Publication Data

US 2012/0005388 A1    Jan. 5, 2012

(30) Foreign Application Priority Data

Jul. 5, 2010   (TW) .................................. 99121965

(51) Int. Cl.
*G06F 13/00*   (2006.01)
(52) U.S. Cl. ........................................ 710/300; 709/227
(58) Field of Classification Search .......... 710/300–302; 713/1–2; 709/227
See application file for complete search history.

(56) References Cited

U.S. PATENT DOCUMENTS

2002/0124128 A1*  9/2002  Qiu ............................... 710/302
2004/0059901 A1*  3/2004  Miller et al. ...................... 713/1

* cited by examiner

*Primary Examiner* — Clifford Knoll
(74) *Attorney, Agent, or Firm* — Altis Law Group, Inc.

(57) ABSTRACT

An exemplary high speed data storage system includes hard disks, a first control panel, a second control panel and a midplane interconnected between each of the first and second control panels and the hard disks. Each of the first and second control panels includes a control chip and a connector. First and second printed circuit wires corresponding to the hard disks are layered on the first and second control panels for electrically connecting the control chip with the connector, respectively. The first printed circuit wires of the first control panel and the second printed circuit wires of the second control panel are arranged symmetrically with respect to each other, and an order of stacking circuit layers of the first printed circuit wires of the first control panel is the reverse of an order of stacking of circuit layers of the second printed circuit wires of the second control panel.

12 Claims, 2 Drawing Sheets

HIGH SPEED DATA STORAGE SYSTEM

BACKGROUND

1. Technical Field

The present disclosure relates to a high speed data storage system with improved data transmission performance for hard disks.

2. Description of Related Art

In a typical high speed data storage system with a large capacity, two or more control panels are included for processing read requests (data readout requests) and write requests (data write requests) at high speed by parallel operation of a large number of hard disks.

Referring to FIG. 2, a conventional high speed data storage system 10 includes a disk array, a midplane 14, a first control panel 11 and a second control panel 12. The disk array includes twenty-four hard disks 13. Each of the first and second control panels 11, 12 includes control chips 110, 120 and connectors 112, 122. A plurality of first printed circuit wires 113, 123 for electrically connecting the control chips 110, 120 with the connectors 112, 122 is layered in each of the first and second control panels 11, 12. The midplane 14 includes first and second connecting sockets 141, 142 at a first side, and a plurality of connecting ports 146 at a second side opposite to the first side. A plurality of second printed circuit wires 144, 145 for electrically connecting each of the first and second connecting sockets 141, 142 with the connecting ports 146 is layered in the midplane 14.

When the high speed data storage system 10 is assembled, the hard disks 13 connect with the connecting ports 146 of the midplane 14, respectively; and the connectors 112, 122 of the first and second control panels 11, 12 connect with the first and second connecting sockets 141, 142, of the midplane 14, respectively. Thus, the control chips 110, 120 of each of the first and second control panels 11, 12 electrically connect each of the hard disks 13 by corresponding first printed circuit wires 113, 123 and corresponding second printed circuit wires 144, 145. During operation, control signals from each of the control chips 110, 120 are transmitted to each of the hard disks 13 by the corresponding first printed circuit wires 113, 123 and the corresponding second printed circuit wires 144, 145. Therefore, a length of a transmission path for the control signals between each of the control chips 110, 120 and each of the hard disks 13 is substantially equal to a sum of lengths of the corresponding first printed circuit wires 113, 123 and the corresponding second printed circuit wires 144, 145.

The transmission paths between the control chip 110 of the first control panel 11 and the hard disks 13 are referred to as first channels hereinafter. The transmission paths between the control chip 120 of the second control panel 12 and the hard disks 13 are referred to as second channels hereinafter. Due to the first printed circuit wires 113, 123 of each of the first and second control panels 11, 12 corresponding to different hard disks 13 and the second printed circuit wires 144, 145 of the midplane 14 corresponding to the different hard disks 13 being different from each other, lengths of the first channels and lengths of the second channels are also different from each other. The following are symbols used in the conventional high speed data storage system 10:

x: serial number of one hard disk 13;
L: length of the first printed circuit wires 113, 123 of each of the first and second control panels 11, 12 corresponding to the hard disk 13;
h1: length of the second printed circuit wire 144 corresponding to the hard disk 13 and connected between the first connecting socket 141 and the corresponding connecting port 146;
h2: length of the second printed circuit wire 145 corresponding to the hard disk 13 and connected between the second connecting socket 142 and the corresponding connecting port 146;
ttl1: length of the corresponding first channel; and
ttl2: length of the corresponding second channel.

Table 1 shows data of x, L, h1, h2, ttl1, and ttl2 of the high speed data storage system 10.

TABLE 1

| x | L (mil) | h1 (mil) | h2 (mil) | ttl1 (mil) | ttl2 (mil) |
|---|---------|----------|----------|------------|------------|
| 1 | 2070.49 | 10812 | 1810 | 12882.49 | 3880.49 |
| 2 | 1933.39 | 10251 | 1671 | 12184.39 | 3604.39 |
| 3 | 1776.09 | 9890 | 2229 | 11666.09 | 4005.09 |
| 4 | 1639.92 | 10235 | 2880 | 11874.92 | 4519.92 |
| 5 | 1629.76 | 8436 | 3449 | 10065.76 | 5078.76 |
| 6 | 1571.38 | 7863 | 4060 | 9434.38 | 5631.38 |
| 7 | 1572.09 | 12221 | 2286 | 13793.09 | 3858.09 |
| 8 | 1473.55 | 11010 | 2828 | 12483.55 | 4301.55 |
| 9 | 1530.79 | 9670 | 3398 | 11200.79 | 4928.79 |
| 10 | 1504.09 | 8640 | 4090 | 10144.09 | 5594.09 |
| 11 | 1553.69 | 7926 | 4553 | 9479.69 | 6106.69 |
| 12 | 1604.88 | 7041 | 5306 | 8645.88 | 6910.88 |
| 13 | 1637.18 | 5503 | 5569 | 7140.18 | 7206.18 |
| 14 | 1725.96 | 4908 | 7444 | 6633.96 | 9169.96 |
| 15 | 2430.9 | 4350 | 8314 | 6780.9 | 10744.9 |
| 16 | 2518.5 | 3786 | 10244 | 6304.5 | 12762.5 |
| 17 | 2618.87 | 3289 | 11483 | 5907.87 | 14101.87 |
| 18 | 2558.85 | 2862 | 12589 | 5420.85 | 15147.85 |
| 19 | 3746.58 | 2578 | 9425 | 6324.58 | 13171.58 |
| 20 | 3828.64 | 2251 | 10441 | 6079.64 | 14269.64 |
| 21 | 3971.15 | 2629 | 11333 | 6600.15 | 15304.15 |
| 22 | 3989.03 | 3289 | 11382 | 7278.03 | 15371.03 |
| 23 | 4219.6 | 3991 | 12085 | 8210.6 | 16304.60 |
| 24 | 4358.51 | 4607 | 12711 | 8965.51 | 17069.51 |

According to table 1, a maximum length of the second channels (i.e., 17069.51 mil) exceeds a maximum length of the first channels (i.e., 13793.09 mil) by more than 3 inches (i.e., 3276.42 mil), and the lengths of several second channels are larger than the maximum length of the first channels. Thus, a transmission performance between the control chip 120 of the second control panel 12 and the hard disks 13 is liable to be much worse than a transmission performance between the control chip 110 of the first control panel 11 and the hard disks 13. This adversely affects writing and reading speeds of the high speed data storage system 10.

It is thus desirable to provide a high speed data storage system which can overcome the described limitations.

DETAILED DESCRIPTION

Figure 1:
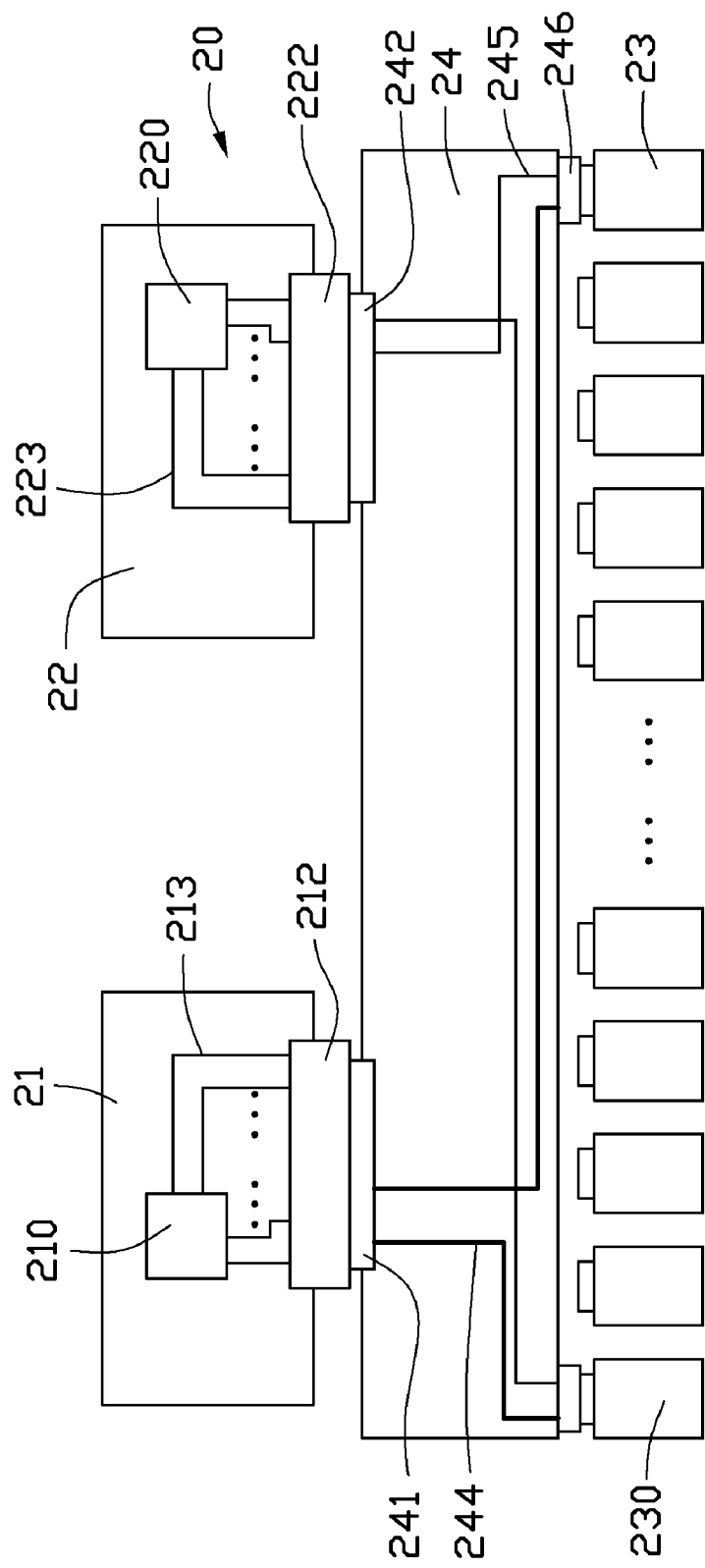
FIG. 1 is a block diagram schematically showing a high speed data storage system according to an exemplary embodiment of the present disclosure.
Figure 2:
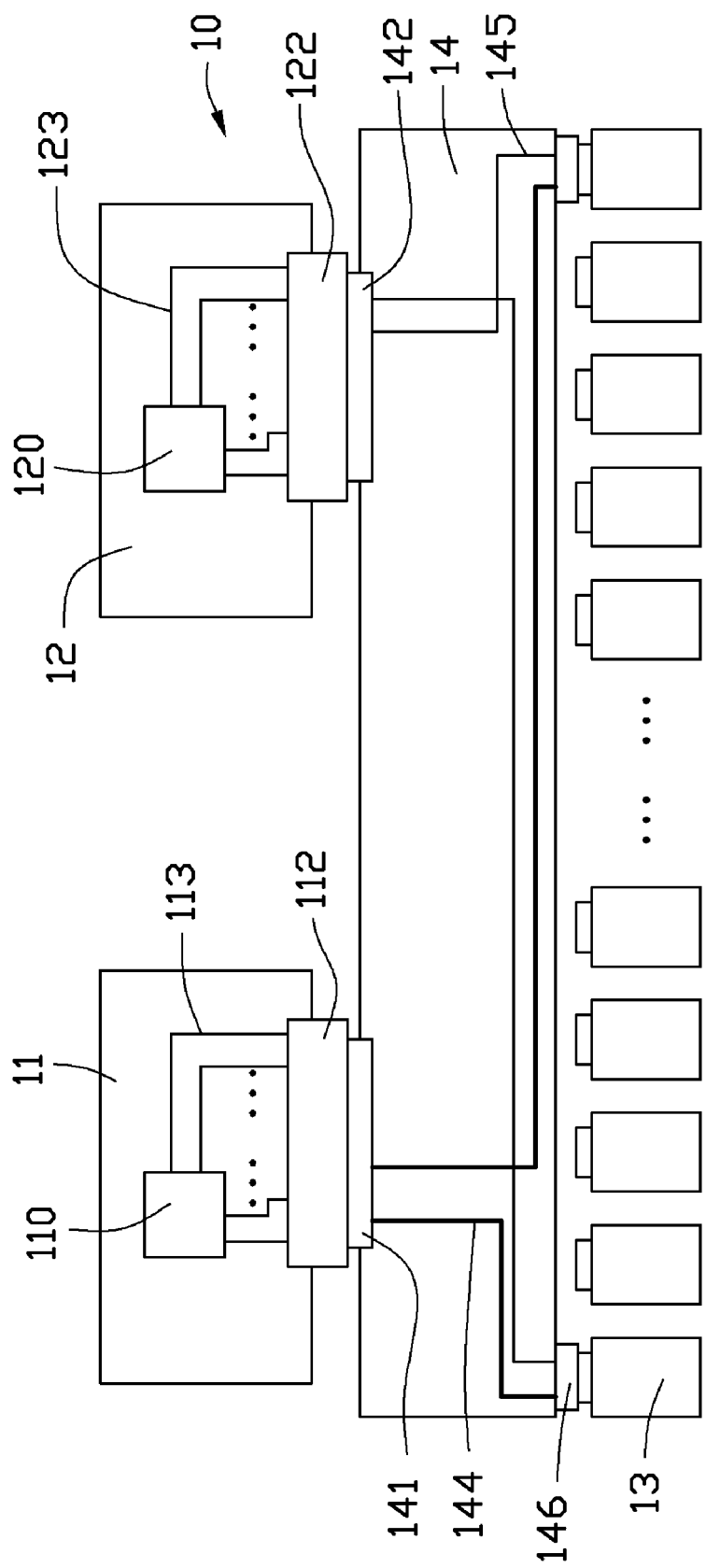
FIG. 2 is a block diagram schematically showing a high speed data storage system in accordance with related art.

Reference will now be made to the drawing figures to describe the present high speed data storage system in detail.

Referring to FIG. 1, a high speed data storage system 20 according to an exemplary embodiment of the present disclosure is shown. The high speed data storage system 20 includes a disk array 23, a first control panel 21, a second control panel 22, and a midplane 24 interconnecting the first and second control panels 21, 22 and the disk array 23.

The disk array 23 includes a plurality of hard disks 230 arranged in a regular array. In this embodiment, the disk array 23 includes twenty-four hard disks 230 arranged in a series, in order from a first hard disk to a twenty-fourth hard disk along a left-to-right direction.

The first control panel 21 includes a first control chip 210 mounted on a central portion of a top side thereof and a first connector 212 mounted at a peripheral side thereof. A plurality of first printed circuit wires 213 is layered in the first control panel 21 for electrically connecting the first control chip 210 with the first connector 212. The first printed circuit wires 213 correspond to the hard disks 230, respectively. Each of the first printed circuit wire 213 transmits control signals, i.e., read/write commands, from the first control chip 210 to a corresponding hard disk 230. In FIG. 1, only four first printed circuit wires 213 are shown, for schematically illustrating the first control panel 21 layout.

The second control panel 22 is similar to the first control panel 21, and includes a second control chip 220 mounted on a central portion of a top side thereof and a second connector 222 mounted at a peripheral side thereof. A plurality of second printed circuit wires 223 is layered in the second control panel 22 for electrically connecting the second control chip 220 with the second connector 222. The second printed circuit wires 223 of the second control panel 22 correspond to the hard disks 23, respectively. Each of the second printed circuit wires 223 transmits control signals, i.e., read/write commands, from the second control chip 220 to a corresponding hard disk 230. In FIG. 1, only four second printed circuit wires 223 are shown, for schematically illustrating the second control panel 22 layout.

The second control panel 22 differs from the first control panel 21 only as follows. First, the plurality of first printed circuit wires 213 of the first control panel 21 and the plurality of second printed circuit wires 223 of the second control panel 22 are arranged symmetrically with respect to each other. Second, an order of circuit layers of the first printed circuit wires 213 of the first control panel 21 is the reverse of an order of circuit layers of the second printed circuit wires 223 of the second control panel 22. To achieve this, during manufacturing of the second control panel 22, circuit wires formed on each circuit layer are oriented in a position which is the equivalent of the corresponding circuit wires of the first control panel 21 being flipped over 180° from right to left (as viewed in FIG. 1). In addition, the order of stacking of the circuit layers of the second control panel 22 is the reverse of the order of stacking of the circuit layers of the first control panel 21. That is, the circuit layers of the first control panel 21 which are arranged in order from bottom to top appear in such order from top to bottom in the second control panel 22. Thus, lengths of the first printed circuit wires 213 which correspond to the hard disks 230 in sequence from the first hard disk 230 to the twenty-fourth hard disk 230 are equal to lengths of the second printed circuit wires 223 which correspond to the hard disks 230 in sequence from the twenty-fourth hard disk 230 to the first hard disk 230.

The midplane 24 includes a first connecting socket 241 and a second connecting socket 242 at a first side, and a plurality of connecting ports 246 at a second side opposite to the first side. The first and second connecting sockets 241, 242 connect to the first and second connectors 212, 222 of the first and second control panels 21, 22, respectively. The connecting ports 246 are arranged in a series along the second side of the midplane 24 for connecting the hard disks 230, respectively. A plurality of third printed circuit wires 244 for electrically connecting the first connecting socket 241 with the connecting ports 236, and a plurality of fourth printed circuit wires 245 for electrically connecting the second connecting socket 242 with the connecting ports 246, are layered in the midplane 24. In FIG. 1, only two third printed circuit wires 244 and two fourth printed circuit wires 245 are shown for schematically illustrating the midplane 24 layout.

The third printed circuit wires 244 correspond to the connecting ports 246 (hard disks 230), respectively. When the first connector 212 of the first control panel 21 connects the first connecting socket 241 of the midplane 24, each of the first printed circuit wires 213 electrically connects a corresponding connecting port 246 (a corresponding hard disk 230) by a corresponding third printed circuit wire 244. The fourth printed circuit wires 245 correspond to the connecting ports 246 (hard disks 230), respectively. When the second connector 222 of the second control panel 22 connects the second connecting socket 242 of the midplane 24, each of the second printed circuit wires 223 electrically connects a corresponding connecting port 246 (a corresponding hard disk 230) by a corresponding fourth printed circuit wire 245.

When assembled, the first and second connectors 212, 222 of the first and second control panels 21, 22 connect the first and second connecting sockets 241, 242 of the midplane 24, respectively, and the hard disks 230 connect the connecting ports 246 of the midplane 24, respectively. Therefore, the first control chip 210 connects each of the hard disks 230 by a corresponding first printed circuit wire 213 and a corresponding third printed circuit wire 244. A length of a transmission path for control signals from the first control chip 210 to each of the hard disks 230 is substantially equal to a sum of lengths of the corresponding first printed circuit wire 213 and the corresponding third printed circuit wire 244. The transmission paths between the first control chip 210 and the hard disks 230 are referred to as first channels hereinafter. The second control chip 220 connects each of the hard disks 230 via a corresponding second printed circuit wire 223 and a corresponding fourth printed circuit wire 245. A length of a transmission path for control signals from the second control chip 220 to each of the hard disks 230 is substantially equal to a sum of lengths of the corresponding second printed circuit wire 223 and the corresponding fourth printed circuit wire 245. The transmission paths between the second control chip 220 and hard disks 230 are referred to as second channels hereinafter.

Due to the lengths of the first printed circuit wires 213 which correspond to the hard disks 230 in sequence from the first hard disk 230 to the twenty-fourth hard disk 230 being equal to lengths of the second printed circuit wires 223 which correspond to the hard disks 230 in sequence from the twenty-fourth hard disk 230 to the first hard disk 230, lengths of the second channels of the high speed data storage system 20 are reduced with respect to conventional art. The following are symbols used in this embodiment:

X: serial number of one hard disk 230;
    L1: length of the first printed circuit wire 213 of the first control panel 21 corresponding to the hard disk 230;
    L2: length of the second printed circuit wire 223 of the second control panel 22 corresponding to the hard disk 230;
    H1: length of the third printed circuit wire 244 of the midplane 24 corresponding to the hard disk 230;
    H2: length of the fourth printed circuit wire 245 of the midplane 24 corresponding to the hard disk 230;
    TTL1: length of the corresponding first channel; and
    TTL2: length of the corresponding second channel.

Table 2 shows data of X, L1, L2, H1, H2, TTL1, and TTL2 of the high speed data storage system 20 of the exemplary embodiment.

TABLE 2

| X | L1 (mil) | L2 (mil) | H1 (mil) | H2 (mil) | TTL1 (mil) | TTL2 (mil) |
|---|---|---|---|---|---|---|
| 1 | 2070.49 | 4358.51 | 10812 | 1810 | 12882.49 | 6168.51 |
| 2 | 1933.39 | 4219.6 | 10251 | 1671 | 12184.39 | 5890.6 |
| 3 | 1776.09 | 3989.03 | 9890 | 2229 | 11666.09 | 6218.03 |
| 4 | 1639.92 | 3971.15 | 10235 | 2880 | 11874.92 | 6851.15 |
| 5 | 1629.76 | 3828.64 | 8436 | 3449 | 10065.76 | 7277.64 |
| 6 | 1571.38 | 3746.58 | 7863 | 4060 | 9434.38 | 7806.58 |
| 7 | 1572.09 | 2558.85 | 12221 | 2286 | 13793.09 | 4844.85 |
| 8 | 1473.55 | 2618.87 | 11010 | 2828 | 12483.55 | 5446.87 |
| 9 | 1530.79 | 2518.5 | 9670 | 3398 | 11200.79 | 5916.5 |
| 10 | 1504.09 | 2430.9 | 8640 | 4090 | 10144.09 | 6520.9 |
| 11 | 1553.69 | 1725.96 | 7926 | 4553 | 9479.69 | 6278.96 |
| 12 | 1604.88 | 1637.18 | 7041 | 5306 | 8645.88 | 6943.18 |
| 13 | 1637.18 | 1604.88 | 5503 | 5569 | 7140.18 | 7173.88 |
| 14 | 1725.96 | 1553.69 | 4908 | 7444 | 6633.96 | 8997.69 |
| 15 | 2430.9 | 1504.09 | 4350 | 8314 | 6780.9 | 9818.09 |
| 16 | 2518.5 | 1530.79 | 3786 | 10244 | 6304.5 | 11774.79 |
| 17 | 2618.87 | 1473.55 | 3289 | 11483 | 5907.87 | 12956.55 |
| 18 | 2558.85 | 1572.09 | 2862 | 12589 | 5420.85 | 14161.09 |
| 19 | 3746.58 | 1571.38 | 2578 | 9425 | 6324.58 | 10996.38 |
| 20 | 3828.64 | 1629.76 | 2251 | 10441 | 6079.64 | 12070.76 |
| 21 | 3971.15 | 1639.92 | 2629 | 11333 | 6600.15 | 12972.92 |
| 22 | 3989.03 | 1776.09 | 3289 | 11382 | 7278.03 | 13158.09 |
| 23 | 4219.6 | 1933.39 | 3991 | 12085 | 8210.6 | 14018.39 |
| 24 | 4358.51 | 2070.49 | 4607 | 12711 | 8965.51 | 14781.49 |

Comparing Table 2 with Table 1, a maximum length of the second channels (i.e., 14781.49 mil) of the high speed data storage system 20 is decreased about 2.5 inches with respect to a maximum length (i.e., 13793.09 mil) of the second channels of the above-described conventional art. In addition, the lengths of most of the second channels are decreased to approach the lengths of the first channels. Thus, transmission performance between the second control chip 220 and the hard disks 230 is improved. Furthermore, the transmission performance between the second control chip 220 and the hard disks 230 is approximately as good as the transmission performance between the first control chip 210 and the hard disks 230, such that reading/writing speeds of the high speed data storage system 20 can be increased significantly.

It is to be understood, however, that even though numerous characteristics and advantages of the exemplary embodiment have been set forth in the foregoing description, together with details of the structures and functions of the exemplary embodiment, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A high speed data storage system comprising:
a plurality of hard disks;
a first control panel comprising a first control chip and a first connector, and a plurality of first printed circuit wires electrically connecting the first control chip with the first connector being layered in the first control panel, the first printed circuit wires configured for transmitting control signals from the first control chip to the hard disks, respectively;
a second control panel comprising a second control chip and a second connector, and a plurality of second printed circuit wires electrically connecting the second control chip with the second connector being layered in the second control panel, the second printed circuit wires configured for transmitting control signals from the second control chip to the hard disks, respectively; and
a midplane interconnected between the first and second control panels at one side of the midplane and the hard disks at another side of the midplane;
wherein the plurality of first printed circuit wires of the first control panel and the plurality of second printed circuit wires of the second control panel are arranged symmetrically with respect to each other, and an order of stacking of circuit layers of the first printed circuit wires of the first control panel is the reverse of an order of stacking of circuit layers of the second printed circuit wires of the second control panel.

2. The high speed data storage system of claim 1, wherein the number of hard disks is N, N is a natural number larger than one, and lengths of the first printed circuit wires corresponding to the hard disks in a sequence from a first hard disk to an Nth hard disk are substantially equal to lengths of the second printed circuit wires corresponding to the hard disks in a sequence from the Nth hard disk to the first hard disk.

3. The high speed data storage system of claim 2, wherein the midplane comprises a first connecting socket and a second connecting socket electrically connecting with the first and second connectors of the first and second control panels, respectively, and a plurality of connecting ports electrically connected to the hard disks, respectively.

4. The high speed data storage system of claim 3, wherein a plurality of third printed circuit wires corresponding to the hard disks, respectively, are electrically connected between the first connecting socket and the connecting ports, and a plurality of fourth printed circuit wires corresponding to the hard disks, respectively, are electrically connected between the second connecting socket and the connecting ports.

5. The high speed data storage system of claim 4, wherein the first control chip electrically connects each of the hard disks by a corresponding first printed circuit wire and a corresponding third printed circuit wire, and the second control chip electrically connects each of the hard disks by a corresponding second printed circuit wire and a corresponding fourth printed circuit wire.

6. A high speed data storage system comprising:
a disk array comprising N hard disks, wherein N is a natural number larger than one;
a first control panel comprising a first control chip and a plurality of first printed circuit wires being layered in the first control panel for transmitting control signals from the first control chip to the hard disks, respectively; and
a second control panel comprising a second control chip and a plurality of second printed circuit wires being layered in the second control panel for transmitting control signals from the second control chip to the hard disks, respectively;
wherein lengths of the first printed circuit wires corresponding to the hard disks in a sequence from a first hard disk to an Nth hard disk are substantially equal to lengths of the second printed circuit wires corresponding to the hard disks in a sequence from the Nth hard disk to the first hard disk.

7. The high speed data storage system of claim 6, wherein circuit wires formed on each circuit layer of the second control panel are oriented in a position which is the equivalent of the corresponding circuit wires of the first control panel 21 being flipped over 180° from right to left.

8. The high speed data storage system of claim 7, wherein an order of stacking of the circuit layers of the second control panel is the reverse of the order of stacking of the circuit layers of the first control panel.

9. The high speed data storage system of claim 7, wherein the circuit layers of the first control panel which are arranged in order from bottom to top appear in such order from top to bottom in the second control panel.

10. The high speed data storage system of claim 6, wherein a midplane interconnected between the first and second control panels at one side of the midplane and the hard disks at another side of the midplane, the first control panel comprising a first connector at a peripheral side thereof, the second control panel comprising a second connector at a peripheral side thereof, the midplane comprising a first connecting socket and a second connecting socket electrically connecting with the first and second connectors of the first and second control panels, respectively, and a plurality of connecting ports electrically connected to the hard disks, respectively.

11. The high speed data storage system of claim 10, wherein the first printed circuit wires each electrically connect the first control chip with the first connector, and the second printed circuit wire each electrically connect the second control chip with the second connector, and wherein a plurality of third printed circuit wires corresponding to the hard disks, respectively, are electrically connected between the first connecting socket and the connecting ports, and a plurality of fourth printed circuit wires corresponding to the hard disks, respectively, are electrically connected between the second connecting socket and the connecting ports.

12. The high speed data storage system of claim 11, wherein the first control chip electrically connects each of the hard disks by a corresponding first printed circuit wire and a corresponding third printed circuit wire, and the second control chip electrically connects each of the hard disks by a corresponding second printed circuit wire and a corresponding fourth printed circuit wire.

* * * * *